(12) United States Patent
Kim et al.

(10) Patent No.: US 10,594,963 B2
(45) Date of Patent: Mar. 17, 2020

(54) DEVICES AND METHODS FOR LENS SHADING CORRECTION OF AN IMAGE

(71) Applicant: SAMSUNG ELECTRONICS CO., LTD., Suwon-si, Gyeonggi-Do (KR)

(72) Inventors: Se Yun Kim, Hwaseong-si (KR); Yong Gu Lee, Seoul (KR); Tae Hyun Kim, Seongnam-si (KR); Woong Hee Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/437,771

(22) Filed: Jun. 11, 2019

(65) Prior Publication Data

US 2019/0297284 A1 Sep. 26, 2019

Related U.S. Application Data

(63) Continuation of application No. 15/273,009, filed on Sep. 22, 2016, now Pat. No. 10,362,247.

(30) Foreign Application Priority Data

Sep. 24, 2015 (KR) .................. 10-2015-0135466

(51) Int. Cl.
| | |
|---|---|
| *H04N 9/64* | (2006.01) |
| *H04N 5/357* | (2011.01) |
| *H04N 5/232* | (2006.01) |
| *H04N 5/217* | (2011.01) |
| *H04N 9/68* | (2006.01) |
| *H04N 5/20* | (2006.01) |
| *G06T 5/00* | (2006.01) |
| *H04N 9/77* | (2006.01) |
| *H04N 5/235* | (2006.01) |
| *H04N 9/04* | (2006.01) |

(52) U.S. Cl.
CPC .......... *H04N 5/3572* (2013.01); *G06T 5/006* (2013.01); *H04N 5/20* (2013.01); *H04N 5/217* (2013.01); *H04N 5/2351* (2013.01); *H04N 5/23229* (2013.01); *H04N 9/045* (2013.01); *H04N 9/646* (2013.01); *H04N 9/68* (2013.01); *H04N 9/77* (2013.01); *G06T 2207/10024* (2013.01)

(58) Field of Classification Search
CPC .................................................... H04N 5/3572
See application file for complete search history.

(56) References Cited

U.S. PATENT DOCUMENTS

| | | |
|---|---|---|
| 5,764,308 A | 6/1998 | Lee |
| 7,609,305 B2 | 10/2009 | Fainstain et al. |
| 8,049,795 B2 | 11/2011 | Noh |
| 8,054,350 B2 | 11/2011 | Kyung |
| 8,106,976 B2 | 1/2012 | Kawasaka |
| 8,406,557 B2 | 3/2013 | Park et al. |
| 8,542,919 B2 | 9/2013 | Seo et al. |
| 8,638,342 B2 | 1/2014 | Cote et al. |
| 8,970,744 B2 | 3/2015 | Nguyen |

(Continued)

*Primary Examiner* — Gary C Vieaux
(74) *Attorney, Agent, or Firm* — Volentine, Whitt & Francos, PLLC

(57) ABSTRACT

A lens shading correction circuit includes a gain generator configured to generate a first gain value for each pixel of an input image in response to a gain generation parameter, and an adjustment circuit configured to receive the first gain value and first YUV data, and to adjust at least one of U and V values of the first YUV data using at least one of the first gain value and a Y value of the first YUV data.

20 Claims, 10 Drawing Sheets

(56) References Cited

U.S. PATENT DOCUMENTS

| | | |
|---|---|---|
| 8,982,225 B2 | 3/2015 | Ogasahara |
| 2007/0211154 A1 | 9/2007 | Mahmoud et al. |
| 2011/0279710 A1 | 11/2011 | Lee |
| 2015/0070570 A1 | 3/2015 | Tajbakhsh et al. |
| 2016/0379347 A1 | 12/2016 | Chiang et al. |

FIG. 4

TABLE

| Parameters / Brightness | RP | GP | BP |
|---|---|---|---|
| BR1 | RP_11 | GP_11 | BP_11 |
| BR2 | RP_21 | GP_21 | BP_21 |
| BR3 | RP_31 | GP_31 | BP_31 |
| ⋮ | ⋮ | ⋮ | ⋮ |
| BRn | RP_n1 | GP_n1 | BP_n1 |

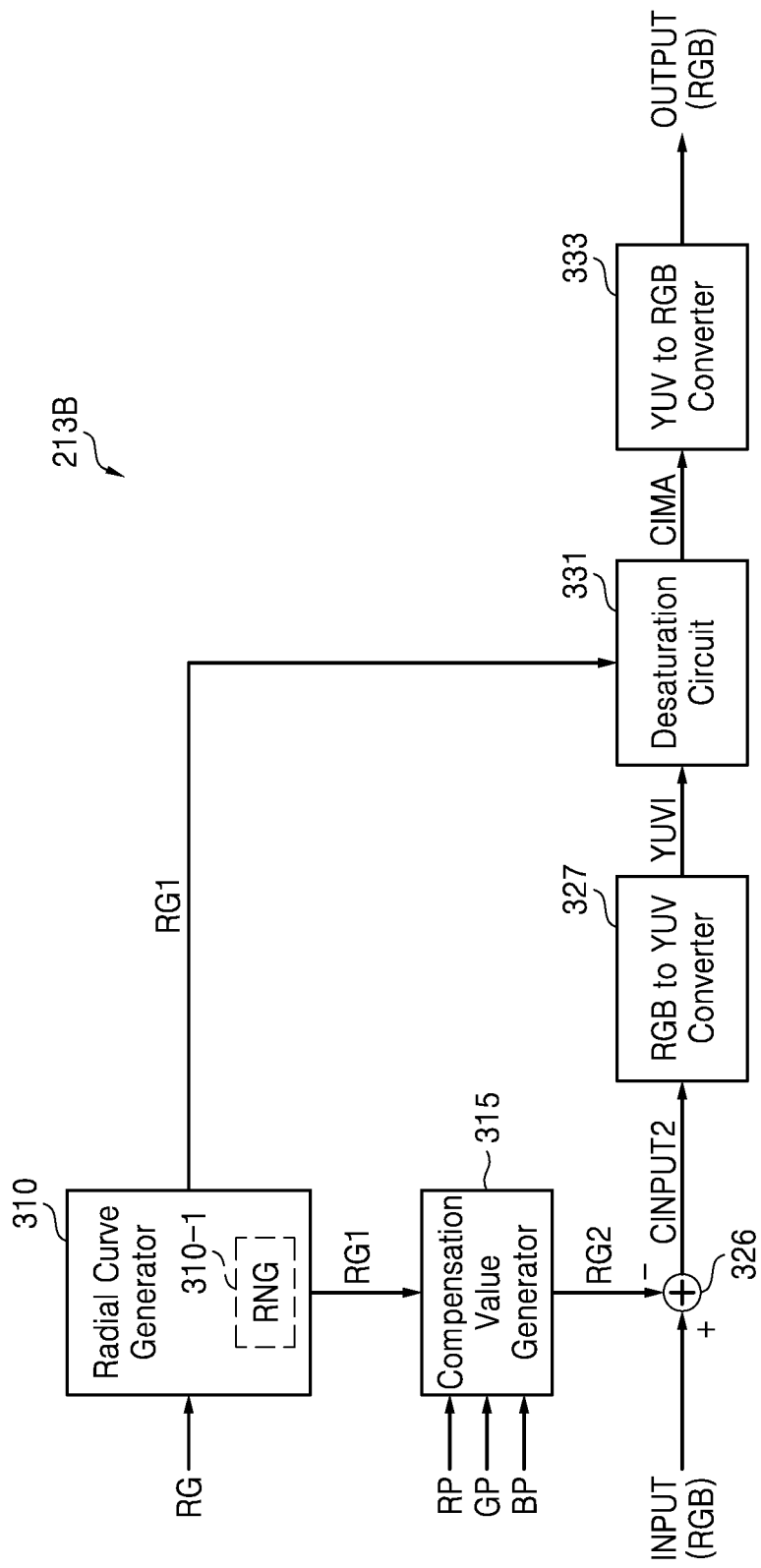

DEVICES AND METHODS FOR LENS SHADING CORRECTION OF AN IMAGE

CROSS-REFERENCE TO RELATED APPLICATION

This is a Continuation of U.S. application Ser. No. 15/273,009, filed Sep. 22, 2016, in which a claim of priority under 35 U.S.C. § 119(a) is made to Korean Patent Application No. 10-2015-0135466 filed on Sep. 24, 2015, the disclosure of which is hereby incorporated by reference in its entirety.

BACKGROUND

Embodiments of the inventive concepts relate to image signal processing devices and methods. More particularly, embodiments of the inventive concepts related to a lens shading correction circuit, a system on chip including a lens shading correction circuit, a data processing system including a camera module and a lens shading correction circuit, and a data processing method for lens shading correction of an image.

The term "vignetting' generally refers to a reduction in light intensity (or brightness) at the periphery of an image relative to the center of the image. Herein, the phrase "lens shading" refers to vignetting resulting from an amount of light reaching off-center positions of a sensor or film being less than the amount of light reaching the center of the sensor or film. The severity of vignetting is dependent upon, for example, the geometry of a lens positioned over the sensor or film, and can vary with focal length and f-stop setting. Generally, vignetting is more visually apparent in lenses of a lower f-stop (or larger aperture).

Lens shading correction techniques may be adopted in an attempt to compensate for adverse visual affects associated with vignetting. For example, to compensate for differing light intensities, components of a gain correction function used in image processing may be determined and set depending on a location within an image. In the case of a pixel image, for example, pixels located closer to a periphery of the image may be subject to greater gain than pixel nearer the center of the image. However, this can result in increased noise levels at the periphery, which can be particularly problematic at low luminance levels where noise is relatively high. This is because the lens shading compensation may entail applying different gains to different colors of an image signal, which may cause a noise power to be different among the colors. When the lens shading compensated signal is later applied to a low-pass filter to remove noise, the differing noise powers of the colors can create the appearance of a color (e.g., red, blue, or purple) distortion at the edge of the image.

SUMMARY

According to an aspect of the inventive concept, a lens shading correction circuit is provided which includes a gain generator configured to generate a first gain value for each pixel of an input image in response to a gain generation parameter, and an adjustment circuit configured to receive the first gain value and first YUV data, and to adjust at least one of U and V values of the first YUV data using at least one of the first gain value and a Y value of the first YUV data.

According to another aspect of the inventive concept, a system on chip is provided which includes a lens shading correction circuit, and a central processing unit (CPU) configured to control the lens shading correction circuit. The lens shading correction circuit includes a gain generator configured to generate a first gain value for each pixel of an input image in response to a gain generation parameter, and an adjustment circuit configured to receive the first gain value and first YUV data, and to adjust at least one of U and V values of the first YUV data using at least one of the first gain value and a Y value of the first YUV data.

According to still another aspect of the inventive concept, a data processing system is provided which includes a camera module configured to generate raw image data, and a system on chip configured to control the camera module. The system on chip includes a lens shading correction circuit configured to perform lens shading correction on the raw image data and a central processing unit (CPU) configured to control the lens shading correction circuit. The lens shading correction circuit includes a gain generator configured to generate a first gain value for each pixel of the raw image data in response to a gain generation parameter, and an adjustment circuit configured to receive the first gain value and first YUV data, and to adjust at least one of U and V values of the first YUV data using at least one of the first gain value and a Y value of the first YUV data.

According to yet another aspect of the inventive concept, a data processing method for lens shading correction of an image is provided. The method includes receiving raw image data of an input image, generating a first gain value for each pixel of the input image in response to a gain generation parameter, adjusting at least one of U and V values of first YUV data of the input image using at least one of the first gain value and a Y value of the first YUV data, and generating output image data of a lens shaded corrected image from the adjusted first YUV data of the input image.

BRIEF DESCRIPTION OF THE DRAWINGS

The above and other aspects and features of the inventive concepts will become readily apparent from the detailed description that follows, with reference to the accompanying drawings, in which:

FIG. 4 is a table showing examples of gain control parameters relative to brightness;

FIG. 6 is a block diagram of some examples of the lens shading correction circuit illustrated in FIG. 2;

DETAILED DESCRIPTION OF THE EMBODIMENTS

Figure 1:
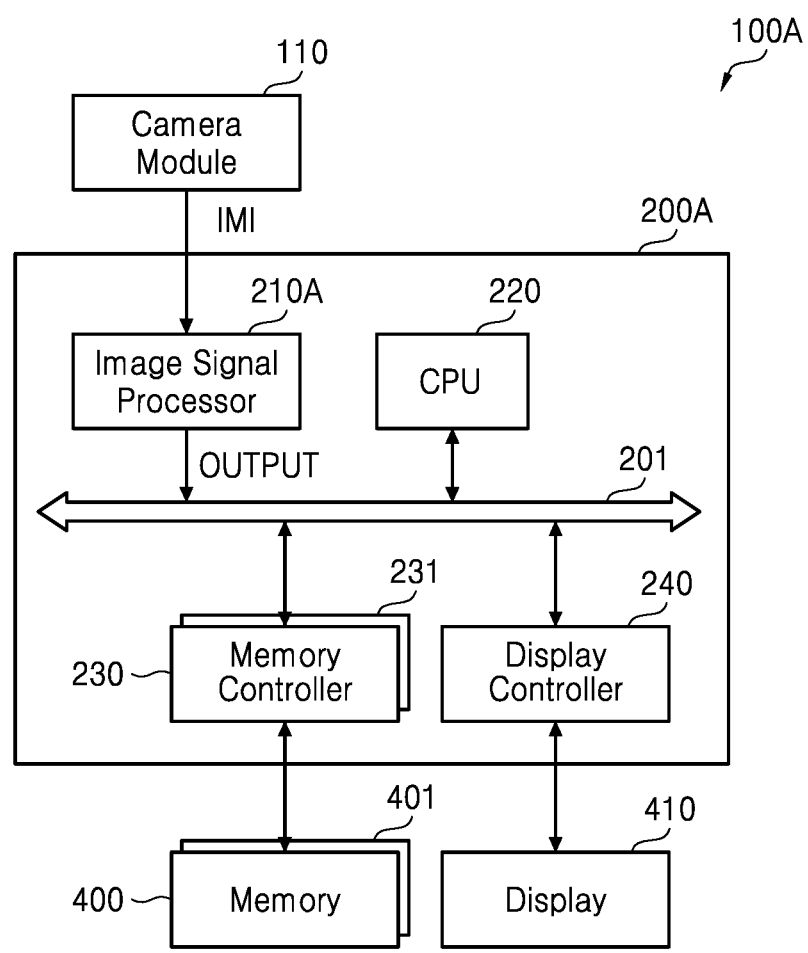
FIG. 1 is a block diagram of a data processing system according to an embodiment of the inventive concepts.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As is traditional in the field of the inventive concepts, embodiments may be described, and illustrated in the drawings, in terms of functional blocks. Those skilled in the art will appreciate that these blocks are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks being implemented with microprocessors or similar, they may be programmed using software (e.g., microcode) perform various functions discussed herein and may optionally be driven by firmware and/or software. Alternatively, unless otherwise stated, each block may be implemented by dedicated hardware, or as a combination of dedicated hardware to perform some functions and a processor (e.g., one or more programmed microprocessors and associated circuitry) to perform other functions. Also, unless otherwise stated, each block of the embodiments may be physically separated into two or more interacting and discrete modules without departing from the scope of the inventive concepts. Conversely, unless otherwise stated, each block of the embodiments may be physically combined into more complex block without departing from the scope of the inventive concepts.

FIG. 1 is a block diagram of a data processing system 100A according to some embodiments of the inventive concepts. Referring to FIG. 1, the data processing system 100A of this example includes a camera module 110, a control circuit 200A, a plurality of memories 400 and 401, and a display 410.

The data processing system 100A may be implemented, for example, as a personal computer (PC) or a mobile device. Examples of a mobile device include a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an Internet of Things (IoT) device, an Internet of Everything (IoE) device, and a drone. However, the inventive concepts are not limited to these examples.

In the example of this embodiment, the camera module 110 generates raw image data IMI of an input image which may be expressed in a Bayer pattern. The camera module 110 may include a lens and at least one image sensor. The raw image data IMI may be two-dimensional (2D) image data or three-dimensional (3D) image data (or stereoscopic image data). A Mobile Industry Processor Interface (MIPI®) camera serial interface (CSI) may be implemented between the camera module 110 and the control circuit 200A.

The control circuit 200A of this embodiment controls the camera module 110, the memories 400 and 401, and the display 410. In the example of this embodiment, the control circuit 200A is a system on chip, meaning that it is an integrated circuit (IC) that integrates all the components thereof on a single chip. Other examples of the manner in which the control circuit 200A may be implemented include integrated circuits (ICs) across multiple chips, processors, application processors (APs), mobile APs, chip sets, modules including chips, and semiconductor chip packages. Also, in the example of this embodiment, the control circuit 200A includes a bus 201, an image signal processor (ISP) 210A, a central processing unit (CPU) 220, a plurality of memory controllers 230 and 231, and a display controller 240.

According to the present embodiment, the ISP 210A performs vignetting correction or lens shading correction on the raw image data IMI output from the camera module 110. In particular, the ISP 210A may remove artifacts of the raw image data IMI taken in a low-luminance environment. The ISP 210A may include a sensor interface which communicates (or receives or transmits) signals with the image sensor of the camera module 110.

In order to prevent or inhibit a particular color (e.g., red, blue, or purple) from being prominent at the periphery of an image due to a lens shading effect, the ISP 210A of this embodiment executes a lens shading correction process and/or controls the color(s) of each of the pixels included in the image taking the brightness of each of the pixels into account. This will be described in detail later herein.

The CPU 220 of this embodiment controls the ISP 210A, the memory controllers 230 and 231, and the display controller 240. In some embodiments, the CPU 220 determines a gain control parameter to be provided for the ISP 210A according to a brightness value. The brightness value may be set for each frame automatically or by a user.

In some embodiments, the CPU 220 calculates or estimates a brightness value of a current frame using a brightness value of at least one previous frame. Alternatively, as another example, the CPU 220 calculates or estimates a brightness value of a current frame based on a brightness signal output from a light sensor (not shown) which is part of or external the control circuit 200A.

In the example of this embodiment, the first memory controller 230 controls the first memory 400 and the second memory controller 231 controls the second memory 401. The first memory 400 may be volatile memory and the second memory 401 may be non-volatile memory. In that case, examples of the first memory 400 include random access memory (RAM), dynamic RAM (DRAM), and static RAM (SRAM), and examples of the second memory 401 include electrically erasable programmable read-only memory (EEPROM), flash memory, magnetic RAM (MRAM), spin-transfer torque MRAM, ferroelectric RAM (FeRAM), phase-change RAM (PRAM), and resistive RAM (RRAM). The second memory 401 may, for example, be implemented as an embedded multimedia card (eMMC) or a universal flash storage (UFS).

The display controller 240 of the example of this embodiment is controlled by the CPU 220 to control the display 410. For example, image data that has been processed by the ISP 210A may be displayed on the display 410 under control of the display controller 240 through an interface (not shown) between the display 410 and display controller 240. Examples of such an interface include an MIPI® display serial interface (DSI) or an interface supporting embedded DisplayPort (eDP).

Figure 2:
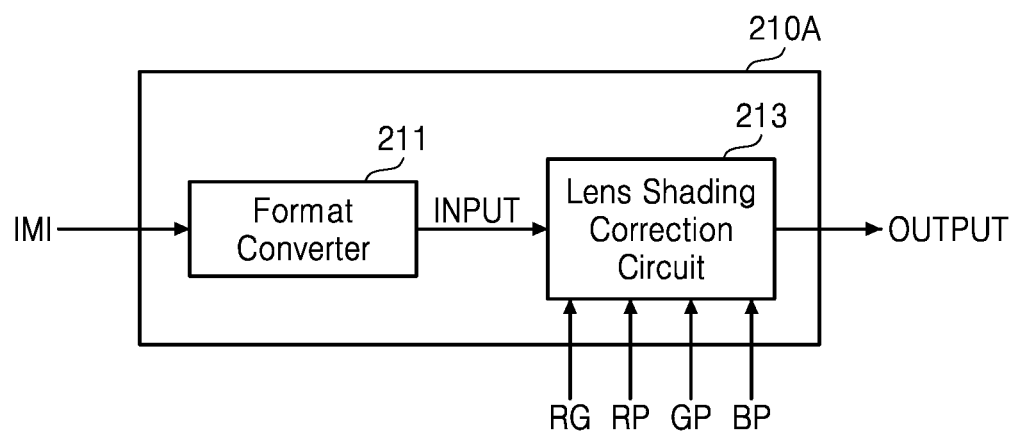
FIG. 2 is a block diagram of an example of an image signal processor illustrated in FIG. 1.

FIG. 2 is a block diagram showing an example of the ISP 210A illustrated in FIG. 1. Referring to FIGS. 1 and 2, the ISP 210A of this example includes a format converter 211 and a lens shading correction circuit 213. The lens shading correction circuit 213 may alternately be referred to as a lens shading compensation circuit.

The format converter 211 converts the raw image data IMI of a first format into input image data INPUT in a second format. For example, the first format may be in a Bayer pattern, but the embodiments are not limited thereto. The second format may be YUV, YIN, YCbCr, YPbPr, or RGB, but again the embodiments are not limited thereto. Here, "Y" denotes a luma component or brightness and "U" and "V" are chrominance components or color information. Also, luminance may be denoted by "Y" or "Y'" where the prime symbol (') denotes gamma compression. The "luminance" means perceptual (color science) brightness and the "luma" means electronic (voltage of display) brightness.

The lens shading correction circuit 213 of this examples performs a process of correcting (or compensating for) lens shading effects on the input image (or the input image data INPUT) and a process of adjusting (e.g., maintaining or decreasing) at least one of color or chrominance components of each of pixels included in the input image data INPUT taking the brightness of each of the pixels into account.

Figure 3:
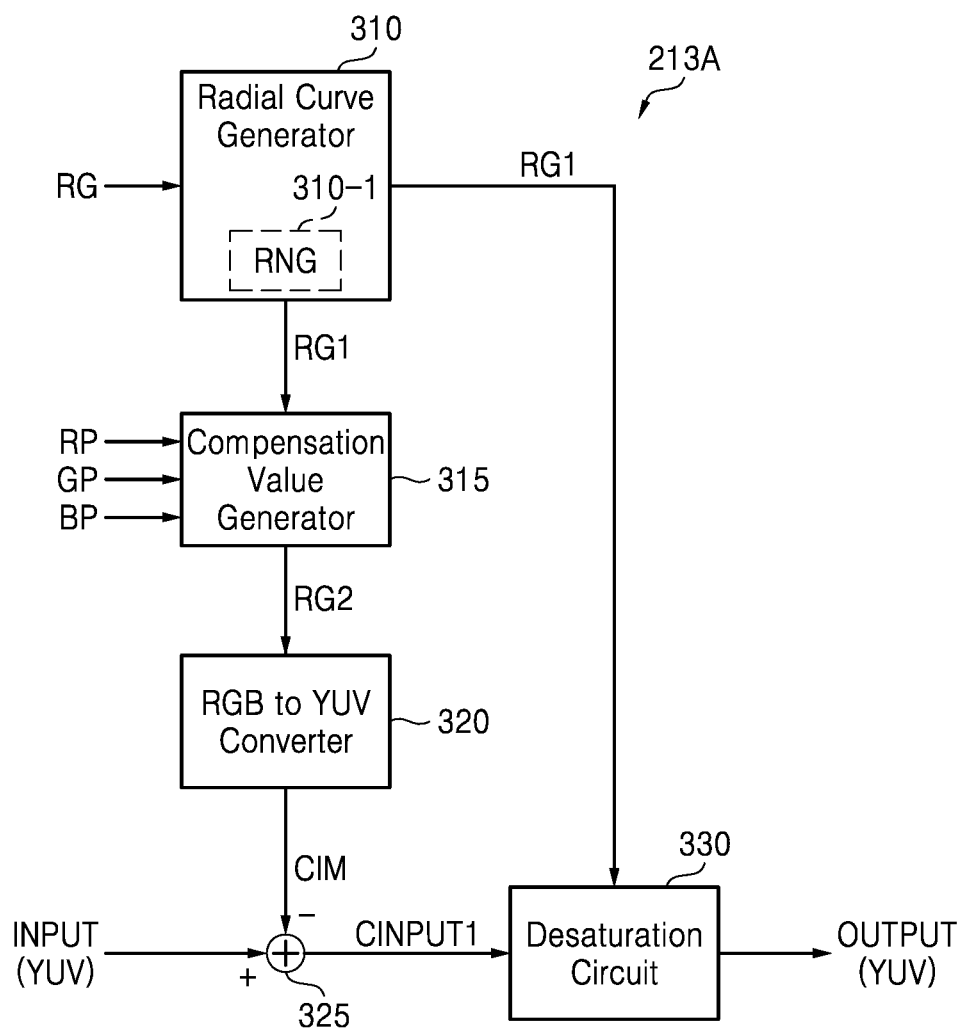
FIG. 3 is a block diagram of an example of a lens shading correction circuit illustrated in FIG. 2.

FIG. 3 is a block diagram of an example 213A of the lens shading correction circuit 213 illustrated in FIG. 2. FIG. 4 illustrates an example of a table containing gain control parameters with respect to brightness. FIGS. 5A through 5D are graphs showing examples of input signals and output signals of the lens shading correction circuit 213 illustrated in FIG. 2.

Referring to FIG. 3, the lens shading correction circuit 213A of this example includes a radial curve generator 310, a compensation value generator 315, an RGB to YUV converter 320, a subtractor 325, and a desaturation circuit 330. Each of these components may be implemented by electronic circuits.

Figure 5A:
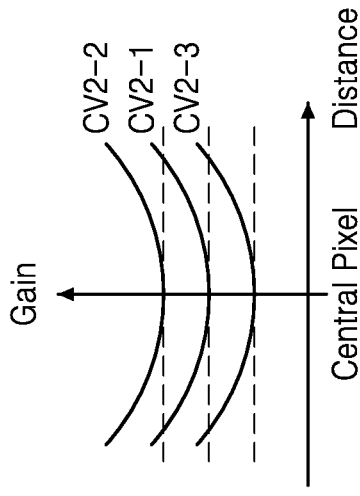
FIG. 5A is a graph showing an example of a relationship between brightness and pixel location of an image signal before lens shading compensation.
Figure 5C:
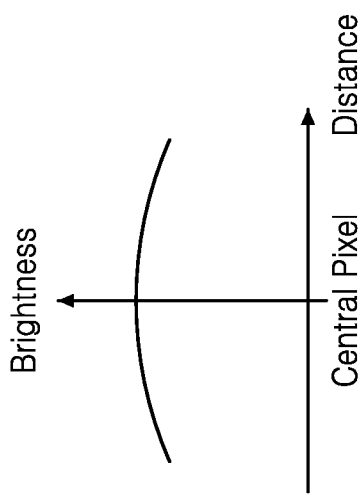
FIGS. 5B and 5C are graphs showing examples of gain curves representing an amount of gain relative to a pixel location applied to an image signal.
Figure 5B:
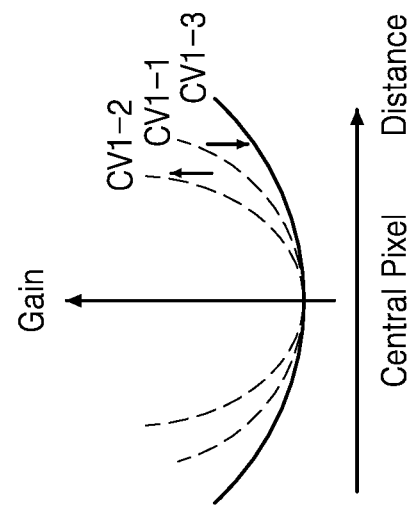

The radial curve generator 310 of this embodiment constitutes a gain generator configured to generate a first gain value RG1 for each pixel in response to a gain generation parameter RG, and output the first gain value RG1 to the compensation value generator 315 and the desaturation circuit 330. In other words, the radial curve generator 310 may generate the first gain value RG1 for lens shading correction of each pixel in response to the gain generation parameter RG. For example, the radial curve generator 310 may generate a radial gain curve, as shown in FIG. 5C, in response to the gain generation parameter RG. FIG. 5C shows gain curves CV2-1, CV2-2, and CV2-3 in two dimensions with respect to the distance from a central pixel Central Pixel positioned at the center of the lens. However, the gain curves CV2-1, CV2-2, and CV2-3 may instead be expressed in three dimensions.

As examples, when the gain generation parameter RG has a first value, the radial curve generator 310 may generate the first gain curve CV2-1 using the gain generation parameter RG having the first value. When the gain generation parameter RG has a second value, the radial curve generator 310 may generate the second gain curve CV2-2 using the gain generation parameter RG having the second value. When the gain generation parameter RG has a third value, the radial curve generator 310 may generate the third gain curve CV2-3 using the gain generation parameter RG having the third value. The value(s) of the gain generation parameter RG may be determined by the CPU 220.

Again as examples, the first gain value RG1 may include a red gain value for red color correction, a green gain value for green color correction, and a blue gain value for blue color correction. Alternatively, the first gain value RG1 may include a cyan gain value for cyan color correction, a yellow gain value for yellow color correction, and a magenta gain value for magenta color correction. However, the inventive concept is not limited to these examples.

In order to calculate gain values different among colors, the gain generation parameter RG may include a parameter for each color. For example, the geometry of a gain curve may be determined using a parametric method, a non-parametric method, or a combination thereof. The non-parametric method represents a curve using a function value of the domain of definition of the curve or a function value of a part of the domain of definition in order to define the shape of the curve. When a value of the curve represents only part of the domain of definition, the other value(s) of the curve may be calculated by interpolating values defined in the vicinity using any of various interpolation techniques.

A second gain value RG2 or second YUV data CIM may be a value (or a signal) which changes slowly according to the position of a pixel. When the second YUV data CIM is subtracted from the input YUV data INPUT, a step (or a height difference) may occur. In order to control the step, which is called a pseudo contour, random noise may be added to the input YUV data INPUT. The radial curve generator 310 may perform an operation of adding noise to the first gain value RG1. In some embodiments, the radial curve generator 310 may also include a random noise generator (RNG) 310-1 which generates the noise. The mean of the noise may be "0", the noise may have a positive value or a negative value, and the positive value or negative value may be adjusted.

The first gain value RG1 may or may not include the noise generated by the RNG 310-1. Also, the first gain value RG1 transmitted to the compensation value generator 315 may be the same as or different from the first gain value RG1 transmitted to the desaturation circuit 330.

The compensation value generator 315 of the example of this embodiment constitutes a gain control circuit configured to adjust the first gain value RG1 using gain control parameters RP, GP, and BP, and output the corresponding second gain value RG2, which is represented in an RGB domain, to the converter 320. The compensation value generator 315 may adjust or change the whole or part of a radial gain curve generated by the radial curve generator 310.

When the first gain value RG1 includes a red gain value, a green gain value, and a blue gain value; the gain control parameters RP, GP, and BP may include the red parameter RP for adjusting the red gain value, the green parameter GP for adjusting the green gain value, and the blue parameter BP for adjusting the blue gain value. Alternatively, when the first gain value RG1 includes a cyan gain value, a yellow gain value, and a magenta gain value; the gain control parameters RP, GP, and BP may include the cyan parameter RP for adjusting the cyan gain value, the yellow parameter GP for adjusting the yellow gain value, and the magenta parameter BP for adjusting the magenta gain value.

The CPU 220 may read or fetch the gain control parameters RP, GP, and BP corresponding to a brightness value from a table (e.g., the TABLE of FIG. 4) stored in the memory 400 or 401, and may transmit the gain control parameters RP, GP, and BP to the compensation value generator 315. For example, referring to FIG. 4, when the brightness value is a first value BR1, the CPU 220 may transmit the gain control parameters RP (=RP_11), GP (=GP_11), and BP (=BP_11) corresponding to the first value BR1 to the compensation value generator 315.

For example, when the first gain curve CV2-1 is generated by the radial curve generator 310 and the gain control parameters RP (=RP_11), GP (=GP_11), and BP (=BP_11) corresponding to the first value BR1 are transmitted to the compensation value generator 315, the compensation value generator 315 may adjust the first gain value RG1 for each pixel using the first gain value RG1 of the first gain curve CV2-1 and the gain control parameters RP (=RP_11), GP (=GP_11), and BP (=BP_11), and may output the second gain value RG2 which corresponds to the adjustment result. It is assumed that a fourth gain curve CV1-1 is a gain curve corresponding to the second gain value RG2 resulting from the adjustment using the first gain curve CV2-1 and the gain control parameters RP (=RP_11), GP (=GP_11), and BP (=BP_11).

When the brightness value is a second value BR2, the CPU 220 may transmit the gain control parameters RP (=RP_21), GP (=GP_21), and BP (=BP_21) corresponding to the second value BR2 to the compensation value generator 315.

For example, when the first gain curve CV2-1 is generated by the radial curve generator 310 and the gain control parameters RP (=RP_21), GP (=GP_21), and BP (=BP_21) corresponding to the second value BR2 are transmitted to the compensation value generator 315, the compensation value generator 315 may adjust the first gain value RG1 for each pixel using the first gain value RG1 of the first gain curve CV2-1 and the gain control parameters RP (=RP_21), GP (=GP_21), and BP (=BP_21) and may output the second gain value RG2 corresponding to the adjustment result. It is assumed that a fifth gain curve CV1-2 is a gain curve corresponding to the second gain value RG2 resulting from the adjustment using the first gain curve CV2-1 and the gain control parameters RP (=RP_21), GP (=GP_21), and BP (=BP_21).

When the brightness value is a third value BR3, the CPU 220 may transmit the gain control parameters RP (=RP_31), GP (=GP_31), and BP (=BP_31) corresponding to the third value BR3 to the compensation value generator 315. For instance, when the first gain curve CV2-1 is generated by the radial curve generator 310 and the gain control parameters RP (=RP_31), GP (=GP_31), and BP (=BP_31) corresponding to the third value BR3 are transmitted to the compensation value generator 315, the compensation value generator 315 may adjust the first gain value RG1 for each pixel using the first gain value RG1 of the first gain curve CV2-1 and the gain control parameters RP (=RP_31), GP (=GP_31), and BP (=BP_31) and may output the second gain value RG2 corresponding to the adjustment result. It is assumed that a sixth gain curve CV1-3 is a gain curve corresponding to the second gain value RG2 resulting from the adjustment using the first gain curve CV2-1 and the gain control parameters RP (=RP_31), GP (=GP_31), and BP (=BP_31).

As described above, according to the example of the present embodiment, the gain control parameters RP, GP, and BP controls the curvature of each of the gain curves CV2-1, CV2-2, and CV2-3. For example, gain control parameters RP, GP, and BP may be set for each frame, for each window including a plurality of pixels, or for each pixel.

The compensation value generator 315 of the example of this embodiment generates the second gain value RG2 by multiplying the first gain value RG1 by the gain control parameters RP, GP, and BP. The compensation value generator 315 may generate the second gain value RG2 for the lens shading correction in order to reduce the quantity of computations.

The converter 320 of the example of this embodiment constitutes a converter circuit configured to convert the second gain value RG2 into the second YUV data CIM. The second gain value RG2 may be represented in the RGB domain and may be data in an RGB format. In other words, since the correction or compensation of a gain value is performed in the RGB domain by the compensation value generator 315, the converter 320 may convert the data in the RGB format into the second YUV data CIM when the input data INPUT and output data OUTPUT are YUV data.

The subtractor 325 of the example of this embodiment constitutes a subtractor circuit configured to generate first YUV data CINPUT1 by subtracting the second YUV data CIM from the input YUV data INPUT. The brightness (or brightness value) of the input YUV data INPUT having a lens shading effect is illustrated in FIG. 5A.

Figure 5D:
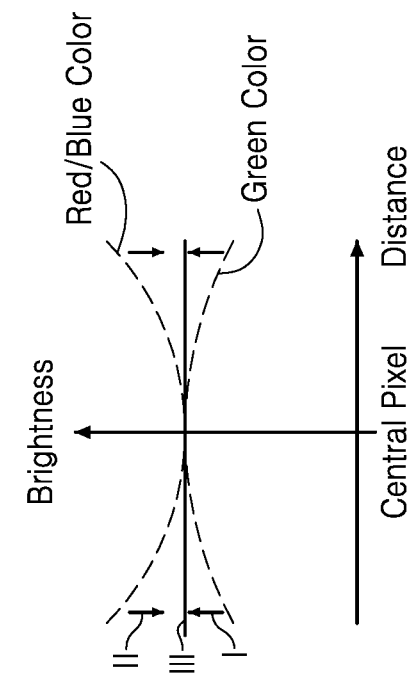
FIG. 5D is a graph showing an example of a relationship between brightness and pixel location of an image signal after lens shading compensation.

In lens shading correction according to some embodiments of the inventive concept, the brightness of green color may be corrected as denoted by an arrow I in FIG. 5D and the brightness of red and blue colors may be corrected as denoted by an arrow II in FIG. 5D. Consequently, the brightness of all green, red and blue colors may be corrected to a level III in FIG. 5D. In conventional lens shading correction, the correction denoted by the arrow II in FIG. 5D is not performed. Although the brightness with respect to the distance from the central pixel Central Pixel positioned at the center of the lens is represented in two dimensions in FIG. 5A, the brightness may instead be represented in three dimensions.

The desaturation circuit 330 of the example of this embodiment constitutes an adjustment circuit configured to receive the first YUV data CINPUT1, adjust at least one of the U and V values of the first YUV data CINPUT1 using at least one of the Y value of the first YUV data CINPUT1 and the first gain value RG1, and generate and output the third YUV data OUTPUT according to the adjustment result.

When the U value or the V value decreases excessively, a green color may emerge in prominence. Therefore, when the U or V value of the first YUV data CINPUT1 output from the subtractor 325 is negative, the desaturation circuit 330 may not adjust the U or V value. However, when the U or V value of the first YUV data CINPUT1 output from the subtractor 325 is positive, the desaturation circuit 330 may decrease the U or V value.

Here, each of the U and V values may be represented in signed expression or by a signed magnitude. When the U and V values are 0, the U and V values may denote an achromatic color. In case where each of the U and V values are represented in unsigned expression, the desaturation circuit 330 may correct (e.g., decrease) at least one of the U and V values when the at least one of the U and V values is higher than a gray point denoting the achromatic color, and may not correct the at least one of the U and V values in order to prevent green color from being prominent when the at least one of the U and V values is lower than the gray point.

A value represented in unsigned expression corresponds to a value obtained by adding a constant value to a value represented in signed expression. Accordingly, decreasing at least one of the U and V values taking the sign into account is construed the same as or similar to processing unsigned expression based on the gray point in the embodiments of the inventive concept.

When the U or V value is expressed in "n" bits, the U or V value may be expressed as $-2^{(n-2)}$ to $2^{(n-2)}-1$, which is a range of values represented in signed expression, or 0 to $2^{(n-1)}-1$, which is a range of values represented in unsigned expression. When $2^{(n-2)}$ is added to each of the values expressed as $-2^{(n-2)}$ to $2^{(n-2)}-1$, values expressed as 0 to $2^{(n-1)}-1$ can be obtained. At this time, $2^{(n-2)}$ may be a constant value. For example, when "n" is 3, $-2^{(n-2)}$ to $2^{(n-2)}-1$ may be expressed as 2, -1, 0, and 1. When the constant value is 2, 0 to $2^{(n-1)}-1$ may be expressed as 0, 1, 2, and 3.

The third YUV data OUTPUT generated by the desaturation circuit 330 may be transmitted to the memory controller 230 or 231 or the display controller 240 according to the control of the CPU 220. The brightness (or brightness value) of the third YUV data OUTPUT is represented by the level III in FIG. 5D. Although the brightness with respect to the distance from the central pixel Central Pixel positioned at the center of the lens is represented in two dimensions in FIG. 5D, the brightness may instead be represented in three dimensions.

The desaturation circuit 330 of the example of this embodiment selectively performs a desaturation operation on at least one of the U and V values of the first YUV data CINPUT1. Accordingly, the desaturation circuit 330 may be referred to as a selective desaturation circuit. The desaturation circuit 330 may reduce reddish color data, bluish color data, and/or purplish color data in the first YUV data CINPUT1 (as denoted by the arrow II in FIG. 5D). Accordingly, as denoted by the arrow II in FIG. 5D, the desaturation circuit 330 may remove reddish, bluish and/or purplish color from an image corresponding to the first YUV data CINPUT1.

FIG. 6 is a block diagram of another example 213 B of the lens shading correction circuit 213 illustrated in FIG. 2. Referring to FIGS. 1, 2, and 6, the lens shading correction circuit 213B of this example includes a radial curve generator 310, a compensation value generator 315, a subtractor 326, a first (RGB to YUV) converter 327, a desaturation circuit 331, and a second (YUV to RGB) converter 333. In contrast to the embodiment of FIG. 3 in which the input data INPUT and the output data OUTPUT have the YUV format, the embodiment of FIG. 6 is characterized by the input data INPUT and the output data OUTPUT having the RGB format. A detailed description of the same or similar elements already described with reference to FIG. 3 will not be repeated below in the description of FIG. 6.

The radial curve generator 310 in the example of this embodiment generates the first gain value RG1 for each pixel in response to the gain generation parameter RG and outputs the first gain value RG1 to the compensation value generator 315 and the desaturation circuit 331. In some embodiments, the radial curve generator 310 may also include the RNG 310-1 which generates random noise.

The compensation value generator 315 in the example of this embodiment adjusts the first gain value RG1 using the gain control parameters RP, GP, and BP, and outputs the second gain value RG2, which is represented in the RGB domain, corresponding to the adjustment result.

The subtractor 326 in the example of this embodiment generates first RGB data CINPUT2 by subtracting the second gain value RG2 from the input RGB data INPUT.

The first converter 327 in the example of this embodiment converts the first RGB data CINPUT2 into first YUV data YUVI.

The desaturation circuit 331 in the example of this embodiment receives the first YUV data YUVI, adjusts at least one of the U and V values of the first YUV data YUVI using at least one of the Y value of the first YUV data YUVI and the first gain value RG1, and generates and outputs the second YUV data CIMA according to the adjustment result.

When the U or V value of the first YUV data YUVI output from the first converter 327 is negative, the desaturation circuit 331 may not adjust the U or V value. However, when the U or V value of the first YUV data YUVI output from the first converter 327 is positive, the desaturation circuit 331 may decrease the U or V value.

The desaturation circuit 331 may selectively perform desaturation operation on at least one of the U and V values of the first YUV data YUVI. Accordingly, the desaturation circuit 331 may be referred to as a selective desaturation circuit. As denoted by the arrow II in FIG. 5D, the desaturation circuit 331 may remove reddish, bluish and/or purplish color from an image corresponding to the first YUV data YUVI.

The second converter 333 in the example of this embodiment converts the second YUV data CIMA output from the desaturation circuit 331 into the second RGB data OUTPUT, and transmits the second RGB data OUTPUT to the memory controller 230 or 231 or the display controller 240.

Figure 7:
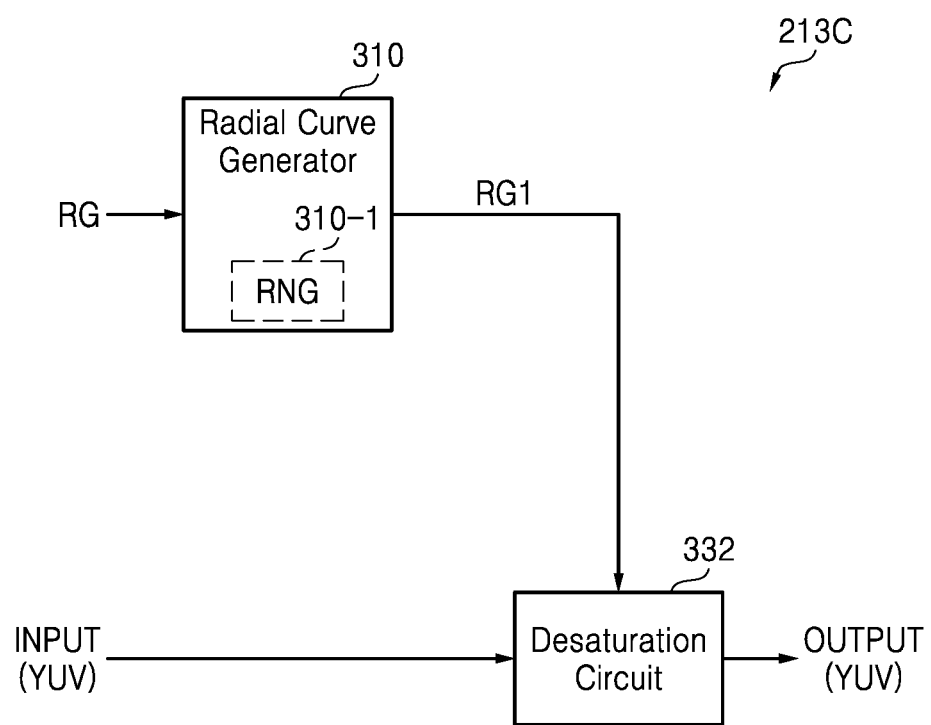
FIG. 7 is a block diagram of another example of the lens shading correction circuit illustrated in FIG. 2.

FIG. 7 is a block diagram of another example 213C of the lens shading correction circuit 213 illustrated in FIG. 2. A detailed description of the same or similar elements already described with reference to FIGS. 3 and 6 will not be repeated below in the description of FIG. 7.

Referring to FIGS. 1, 2, and 7, the lens shading correction circuit 213C of this example includes a radial curve generator 310 and a desaturation circuit 332. The example of FIG. 7 shows the input data INPUT and the output data OUTPUT having the YUV format.

The radial curve generator 310 in the example of this embodiment generates the first gain value RG1 for each pixel in response to the gain generation parameter RG, and outputs the first gain value RG1 to the desaturation circuit 332. In some embodiments, the radial curve generator 310 may also include the RNG 310-1 which generates random noise.

The desaturation circuit 332 in the example of this embodiment receives the input YUV data INPUT, adjusts at least one of the U and V values of the input YUV data INPUT using at least one of the Y value of the input YUV data INPUT and the first gain value RG1, and outputs the output data OUTPUT corresponding to the adjustment result. The output data OUTPUT may be transmitted to the memory controller 230 or 231 or the display controller 240.

Figure 8:
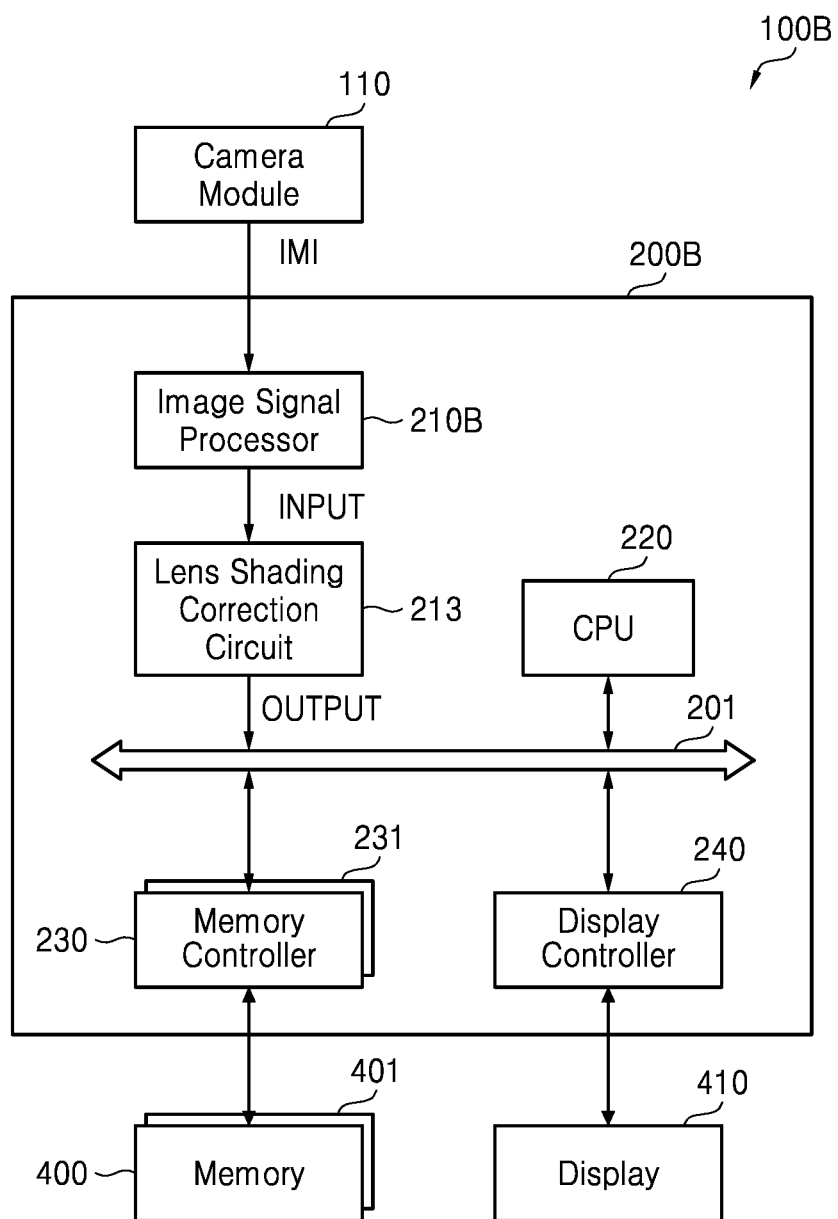
FIG. 8 is a block diagram of a data processing system according to an embodiment of the inventive concept.

FIG. 8 is a block diagram of a data processing system 100B according to some embodiments of the inventive concept. In contrast to the lens shading correction circuit 213 being located inside of the ISP 210A in the embodiment illustrated in FIG. 2, the lens shading correction circuit 213 is formed external an ISP 210B in the embodiment illustrated in FIG. 8. In other words, the lens shading correction circuit 213 may be implemented as an independent intellectual property (IP) or semiconductor chip. Otherwise, like reference numbers refer to like elements in FIGS. 2 and 8.

The ISP 210B may convert the raw image data IMI having a first format into the input image data INPUT having a second format. As described above, the first format may be the Bayer pattern, but the inventive concept is not limited thereto. The second format may be YUV, Y'UV, YCbCr, YPbPr, or RGB, but again the inventive concept is not limited thereto. The lens shading correction circuit 213 illustrated in FIG. 8 may be implemented as the lens shading correction circuit 213A illustrated in FIG. 3, the lens shading correction circuit 213B illustrated in FIG. 6, or the lens shading correction circuit 213C illustrated in FIG. 7.

Figure 9:
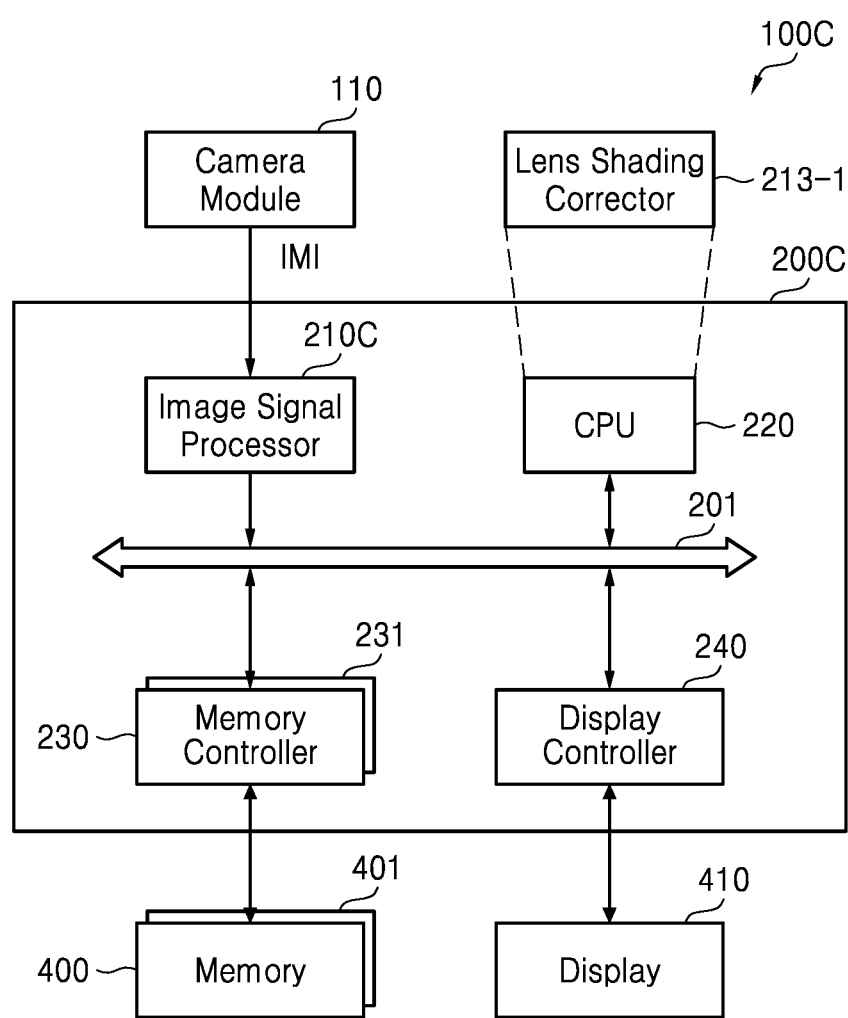
FIG. 9 is a block diagram of a data processing system according to an embodiment of the inventive concept.

FIG. 9 is a block diagram of a data processing system 100C according to some embodiments of the inventive concept. While the lens shading correction circuit 213 illustrated in FIGS. 2 and 8 may be implemented in hardware, a lens shading corrector 213-1 illustrated in FIG. 9 may be a software component or a computer-readable program, which can be executed in the CPU 220. Otherwise, like reference numbers refer to like elements in FIGS. 2 and 8.

The lens shading corrector 213-1 may be stored in the memory 401. When the data processing system 100C is booted, the lens shading corrector 213-1 may be loaded from the memory 401 to the memory 400. The lens shading corrector 213-1 loaded to the memory 400 may be executed in the CPU 220.

The lens shading corrector 213-1 may include a processing block which performs processes which are the same as or similar to that of each of the elements 310, 315, 320, 325, and 330 described with reference to FIG. 3. Each processing block can be written as software or computer-readable program codes.

Alternatively, the lens shading corrector 213-1 may include a processing block which performs processes which are the same as or similar to that of each of the elements 310, 315, 326, 327, 331, and 333 described with reference to FIG. 6. Each processing block can be written as software or computer-readable program codes.

As another alternative, the lens shading corrector 213-1 may include a processing block which performs processes which are the same as or similar to that of each of the elements 310 and 332 described with reference to FIG. 7. Each processing block can be written as software or computer-readable program codes.

Figure 10:
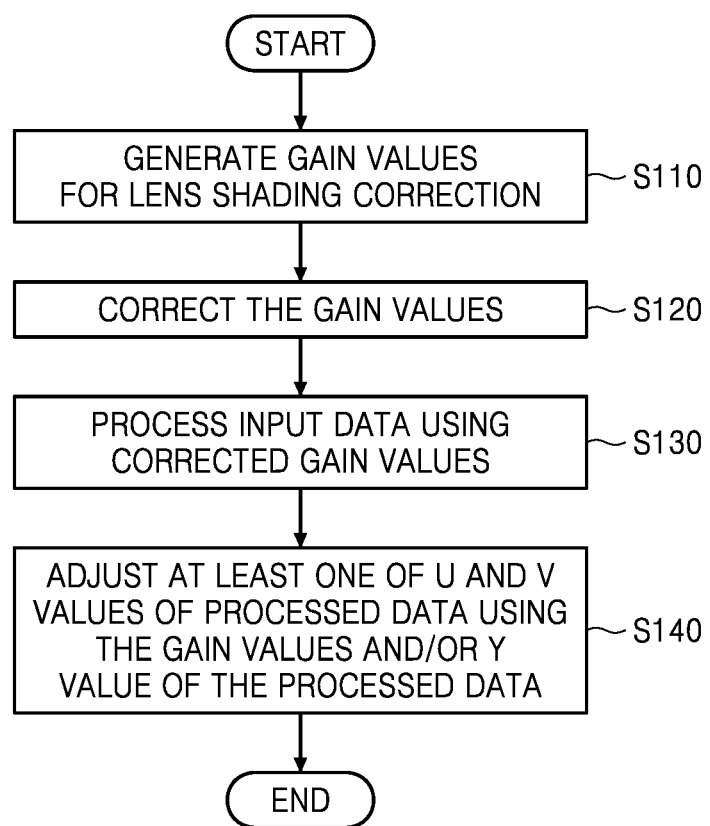
FIG. 10 is a flowchart for reference in describing a lens shading correction method carried out by a data processing system according to an embodiment of the inventive concept.

FIG. 10 is a flowchart for reference in describing the operations of a data processing system according to some embodiments of the inventive concept. Referring to FIGS. 1 through 6 and FIG. 10, the lens shading correction circuit 213, 213A, or 213B (collectively denoted by reference numeral 213) may generate gain values RG1 for lens shading correction (or compensation) in response to the gain generation parameter RG in operation S110. The lens shading correction circuit 213 may generate the gain values RG1 for respective pixels in operation S110.

The lens shading correction circuit 213 may correct the gain values RG1 using the gain control parameters RP, GP, and BP to generate corrected gain values RG2 in operation S120.

The lens shading correction circuit 213 may process the input data INPUT using the input data INPUT and the corrected gain values RG2 in operation S130.

The lens shading correction circuit 213 may decrease at least one of the U and V values of the processed data using the gain values RG1 and/or the Y value of the processed data in operation S140.

As described above, according to some embodiments of the inventive concept, a lens shading correction circuit corrects or compensates for lens shading of an image to be processed and controls the color of each of pixels included in the image taking the brightness of each pixel into account, thereby preventing or inhibiting a particular color such as red, blue, or purple from being prominent at the edge of the image during or after the lens shading correction of the image.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A lens shading correction circuit outputting a second RGB data based on a input RGB data of a input image, comprising:
   a gain generator configured to generate a first gain value for each pixel of an input image in response to a gain generation parameter; and
   an adjustment circuit configured to:
      receive the first gain value,
      generate a first YUV data based on the input RGB data, and
      adjust at least one of U and V values of the first YUV data using at least one of the first gain value and a Y value of the first YUV data,
   wherein the Y value is a luminance value, and the U and V values are chrominance values,
   and
   wherein the gain generator is configured to add a noise to the first gain value.

2. The lens shading correction circuit of claim 1, wherein the adjustment circuit decreases the U value or the V value when the U value or the V value is positive.

3. The lens shading correction circuit of claim 1, further comprising:
a converter configured to convert a second gain value into second YUV data; and
a subtractor configured to generate the first YUV data by subtracting the second YUV data from the input RGB data of the input image.

4. The lens shading correction circuit of claim 3, wherein a gain control circuit generates the second gain value by multiplying a gain control parameter by the first gain value with the added noise.

5. The lens shading correction circuit of claim 4, wherein the adjustment circuit decreases the U value or the V value when the U value or the V value is positive.

6. The lens shading correction circuit of claim 1, further comprising:
a gain control circuit configured to adjust the first gain value with the added noise using a gain control parameter and to output a second gain value represented in an RGB domain according to an adjustment result;
a subtractor configured to generate first RGB data by subtracting the second gain value from the input RGB data;
a first converter configured to convert the first RGB data into the first YUV data; and
a second converter configured to convert second YUV data output from the adjustment circuit into second RGB data.

7. The lens shading correction circuit of claim 6, wherein the gain control circuit generates the second gain value by multiplying the gain control parameter by the first gain value with the added noise.

8. The lens shading correction circuit of claim 7, wherein the adjustment circuit decreases the U value or the V value when the U value or the V value is positive.

9. A system on chip comprising:
a lens shading correction circuit; and
a central processing unit (CPU) configured to control the lens shading correction circuit,
wherein the lens shading correction circuit comprises
a gain generator configured to generate a first gain value for each pixel of an input image according to one of plural gain curves that is selected in response to a gain generation parameter, and
an adjustment circuit configured to receive the first gain value and first YUV data, and to adjust at least one of U and V values of the first YUV data using at least one of the first gain value and a Y value of the first YUV data,
wherein the Y value is a luminance value, and the U and V values are chrominance values,
wherein the gain generation parameter includes a parameter for selecting a first gain curve for a red (R) color, a parameter for selecting a second gain curve for a green (G) color, and a parameter for selecting a third gain curve for a blue (B) color.

10. The system on chip of claim 9, wherein the lens shading correction circuit further comprises:
a gain control circuit configured to adjust the first gain value using a gain control parameter and to output a second gain value represented in an RGB domain according to an adjustment result;
a converter configured to convert a second gain value into second YUV data; and
a subtractor configured to generate the first YUV data by subtracting the second YUV data from input YUV data of the input image.

11. The system on chip of claim 10, wherein the CPU adjusts the gain control parameter using brightness information determined for each frame of the input image.

12. The system on chip of claim 10, wherein a gain control circuit generates the second gain value by multiplying a gain control parameter by the first gain value, and the adjustment circuit decreases the U value or the V value when the U value or the V value is positive.

13. The system on chip of claim 9, wherein the lens shading correction circuit further comprises:
a gain control circuit configured to adjust the first gain value having the added noise using a gain control parameter and to output a second gain value represented in an RGB domain according to an adjustment result;
a subtractor configured to generate first RGB data by subtracting the second gain value from input RGB data;
a first converter configured to convert the first RGB data into the first YUV data; and
a second converter configured to convert second YUV data output from the adjustment circuit into second RGB data.

14. The system on chip of claim 13, wherein the CPU adjusts the gain control parameter using brightness information determined for each frame of the input image.

15. The system on chip of claim 13, wherein the gain control circuit generates the second gain value by multiplying the gain control parameter by the first gain value, and the adjustment circuit decreases the U value or the V value when the U value or the V value is positive.

16. A data processing system comprising:
a camera module configured to generate raw image data; and
a system on chip configured to control the camera module, the system on chip comprising a lens shading correction circuit configured to perform lens shading correction on the raw image data and a central processing unit (CPU) configured to control the lens shading correction circuit,
wherein the lens shading correction circuit comprises:
a gain generator configured to generate a first gain value for each pixel of the raw image data in response to a gain generation parameter; and
an adjustment circuit configured to:
receive the first gain value,
generate a first YUV data based on the input RGB data, and
adjust at least one of U and V values of the first YUV data using at least one of the first gain value and a Y value of the first YUV data,
wherein the Y value is a luminance value, and the U and V values are chrominance values,
and
wherein the gain generator is configured to add a noise to the first gain value.

17. The data processing system of claim 16, wherein the lens shading correction circuit further comprises:
a converter configured to convert a second gain value into second YUV data; and
a subtractor configured to generate the first YUV data by subtracting the second YUV data from input YUV data.

18. The data processing system of claim 17, wherein a gain control circuit generates the second gain value by multiplying a gain control parameter by the first gain value with the added noise.

19. The data processing system of claim 18, further comprising a memory device which comprises a table storing a plurality of gain control parameters relative to brightness values, wherein the CPU correlates brightness information to a brightness value of the table, and selects one of the gain control parameters stored in the table as the gain control parameter corresponding to the brightness value.

20. The data processing system of claim 18, wherein the adjustment circuit decreases the U value or the V value when the U value or the V value is positive.

\* \* \* \* \*